J. R. KING.
Shovel-Plow.
No. 26,597.
Patented Dec. 27, 1859
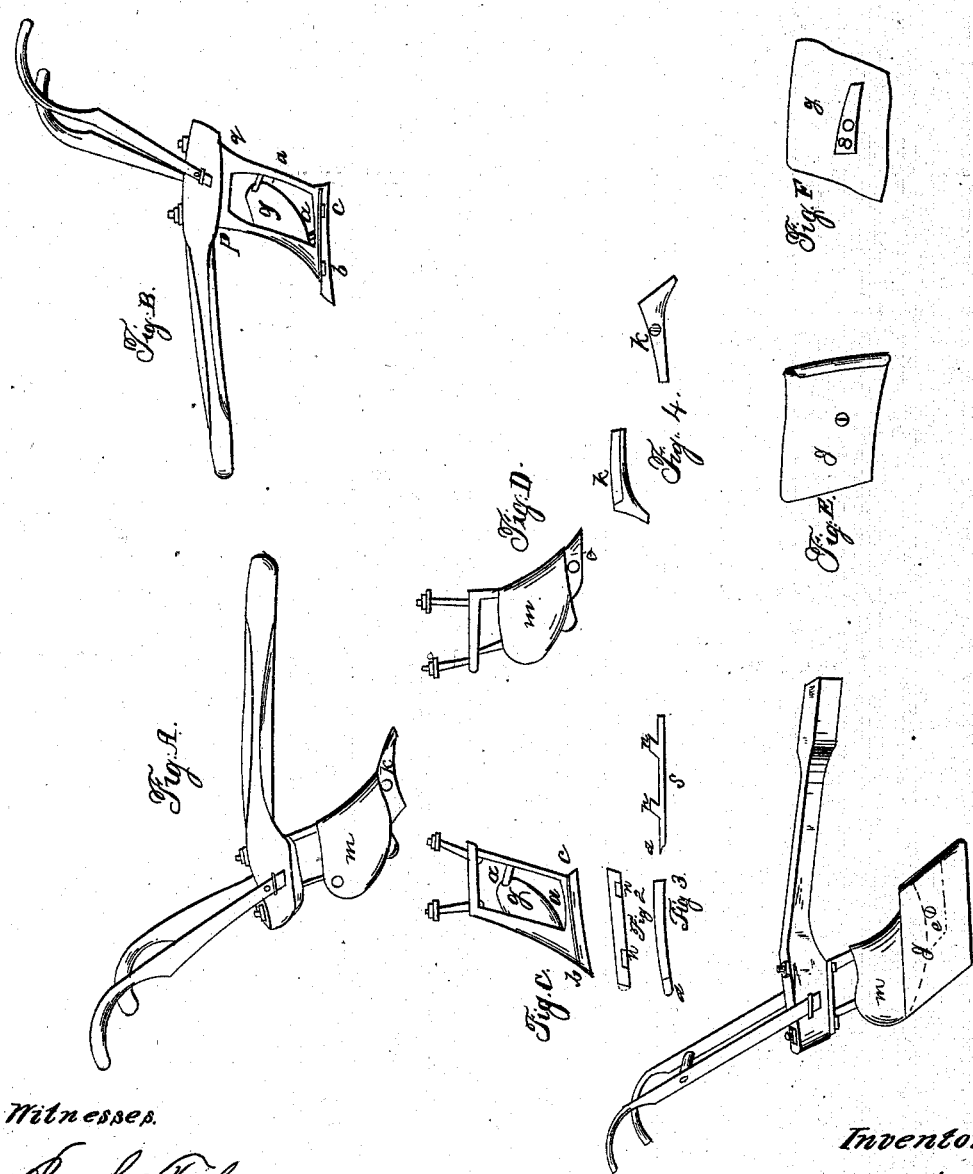

UNITED STATES PATENT OFFICE.

JOHN R. KING, OF RALEIGH, TENNESSEE.

IMPROVEMENT IN COTTON-CULTIVATORS.

Specification forming part of Letters Patent No. 26,597, dated December 27, 1859.

*To all whom it may concern:*

Be it known that I, JOHN R. KING, of Raleigh, in the county of Shelby, in the State of Tennessee, have made a new and useful Improvement on Cast-Iron Plows, with a wrought-iron cotton-scraper attached to the same, for the cultivation of land, &c.; and I do hereby declare that the following is a full, clear, and exact description thereof, reference being had to the accompanying drawings, and to the figures and letters of reference marked thereon, making a part of this specification.

Figure G represents a perspective view of the plow with the cotton-scraper attached.

Fig. A represents a perspective view of the plow with scraper detached.

Fig. B is a perspective view from the land or left-hand side.

Fig. C represents the cast-iron frame $p\ q\ b\ c$ separate from the stock with the extra landside off, and shows the rabbet with the two sloping mortises $b$ and $c$ to receive the tenons $n\ n$ of the extra landside. (Shown in Figs. 2 and 3.)

Figs. 2 and 3 give different views of this landside S, $d$ being a shoulder covered by and filling into a flange, (represented in $k$, Fig. 4.) $n\ n$ are sloping tenons to fit mortises $b$ and $c$. This landside is held firmly in position by being covered at $d$ by flange of point K, Fig. 4, and by the tenons $n\ n$, fitting the mortises $b\ c$.

Fig. D shows the frame and mold-board cast solid together.

$a\ a$, Figs. B and C, represent two braces connecting the frame $p\ q\ b\ c$ to the mold-board $m$—one near the bottom and the other near the top of the wing.

Fig. 4 represents the two sides of the point of plow, intended to cover $e$ of mold-board $m$, also fitting the shoulder of landside shown in Fig. 3.

Fig. E is a front view of the scraper-blade, made of wrought-iron.

Fig. F represents the reverse side of scraper, with the cast-iron flange 8, intended to fit the flange of the plow, (represented by $e$, Fig. D,) similar to the manner described for K, to which it is attached by two rivets.

I am aware that attaching different wings or mold-boards with screw-bolts to the frame, stays, points, landside, and cotton-scraper are in themselves no new devices. These I do not claim as new or of my invention.

What I claim, and desire to secure by Letters Patent, is—

The arrangement of the frame $p\ q\ b\ c$ and wing or mold-board $m$, (cast solid together,) extra landside S, with its tenons $d\ n\ n$, and brace $a$ with the cotton-scraper $g$, as described, for purposes specified.

JOHN R. KING.

Witnesses:
R. S. FIFE,
JOHN F. FULLER.